(No Model.) 3 Sheets—Sheet 2.
G. BURKART.
HARROW.
No. 523,622. Patented July 24, 1894.
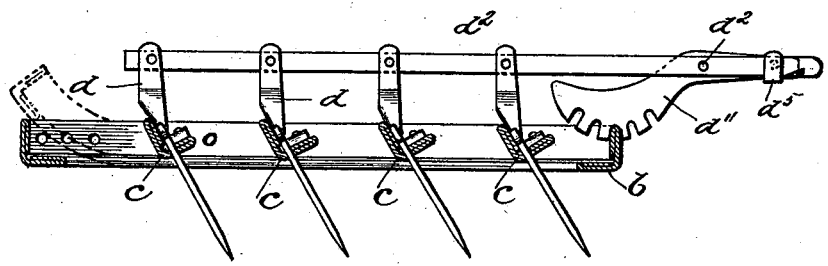
Fig. 2.
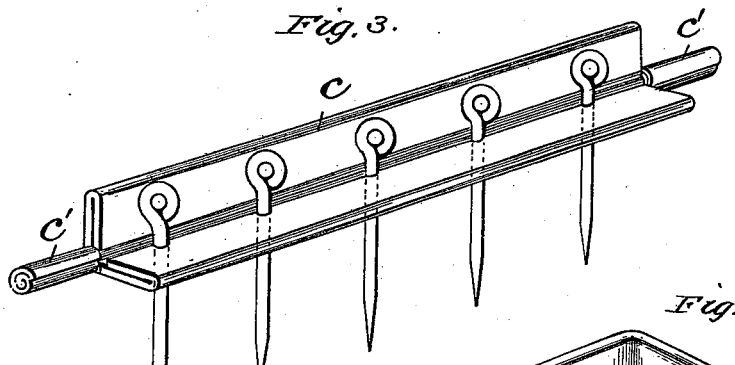
Fig. 3.
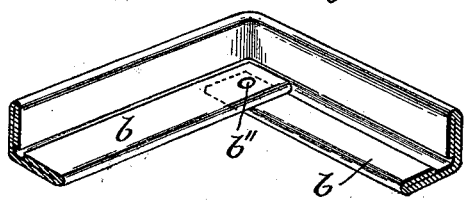
Fig. 4.
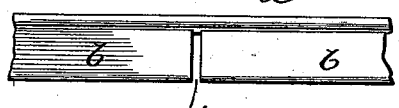
Fig. 5.
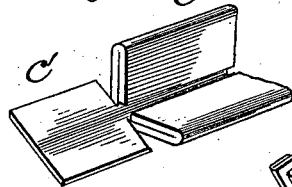
Fig. 6.
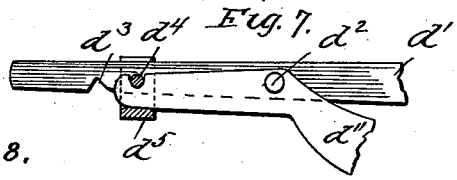
Fig. 7.
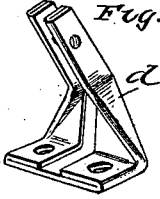
Fig. 8.
Fig. 9.
Witnesses
Inventor,
Guster Burkart,
By Alexander Davis,
Attorneys (No Model.) 3 Sheets—Sheet 3.

G. BURKART.
HARROW.

No. 523,622. Patented July 24, 1894.

Witnesses
Inventor
Gustav Burkart,
By Alexander Davis
Attorneys

UNITED STATES PATENT OFFICE.

GUSTAV BURKART, OF WEST LIBERTY, IOWA.

HARROW.

SPECIFICATION forming part of Letters Patent No. 523,622, dated July 24, 1894.

Application filed March 17, 1894. Serial No. 504,054. (No model.)

*To all whom it may concern:*

Be it known that I, GUSTAV BURKART, a citizen of the United States, residing at West Liberty, in the county of Muscatine and State of Iowa, have invented certain new and useful Improvements in Harrows, of which the following is a specification, reference being had therein to the accompanying drawings, in which—

Figure 1:
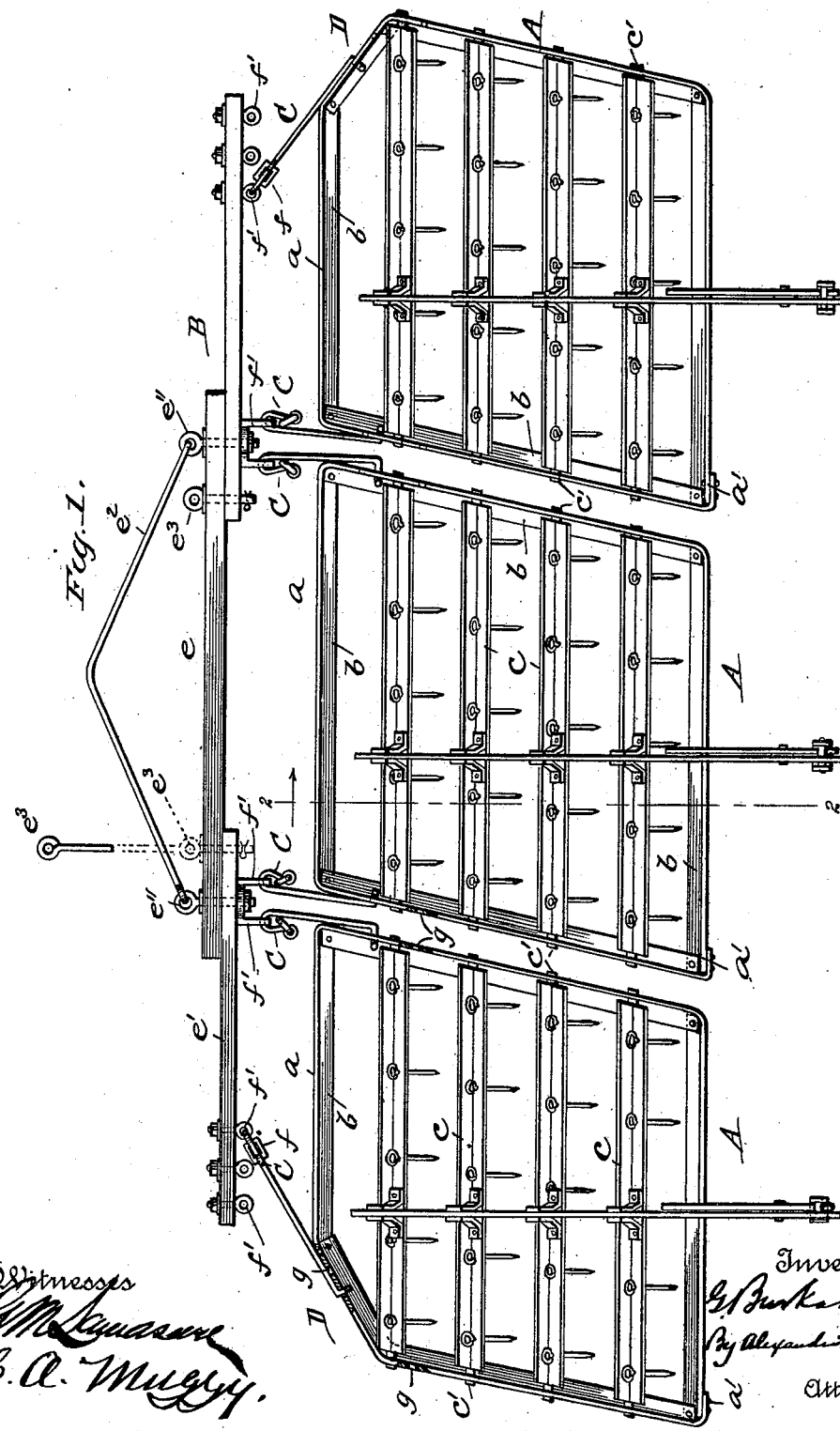
Figure 10:
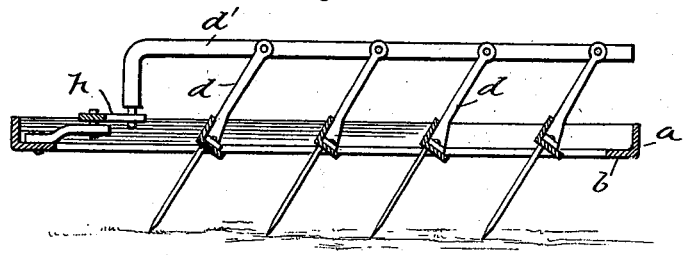
Figure 11:
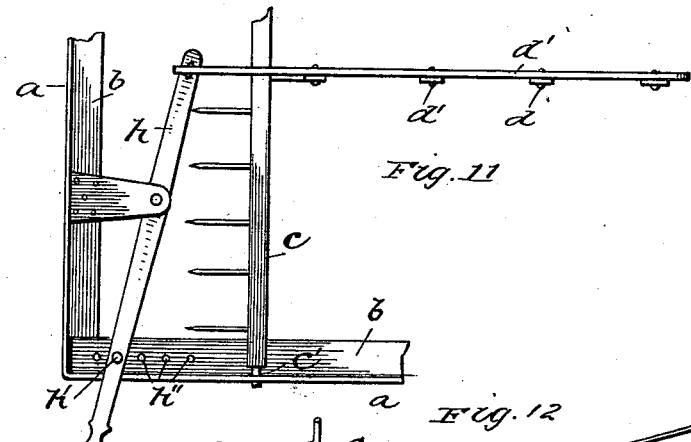
Figure 12:
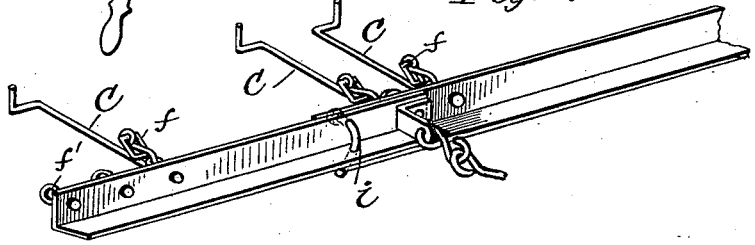
Figure 13:
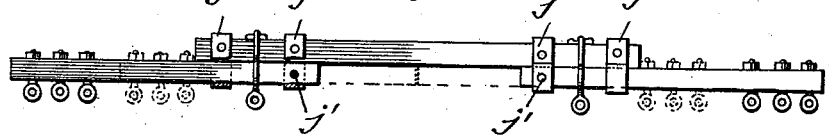

Figure 1 is a plan view of my harrow showing the preferred form of draft-bar and harrow-sections; Fig. 2 a transverse section through one of the frames on line 2—2 of Fig. 1; Fig. 3 a detail perspective of one of the pivoted tooth-bars; Fig. 4 a detail perspective of the corner of one of the sections, showing the manner of overlapping the flanges on the frame-bars; Fig. 5 a detail plan of a portion of a part of one of the frame-bars before it is bent into shape; Fig. 6 a detail perspective of the end of one of the tooth-bars, showing the blank from which the journal is formed by curling; Fig. 7 a detail sectional view showing the manner of locking the adjusting lever shown in Figs. 1 and 3; Fig. 8 a detail perspective of one of the sheet-metal supports or arms carried by the tooth-bar; Fig. 9 a detail perspective of one of the hooks or links connecting the sections to the draft-bar; Figs. 10 and 11, respectively, a vertical section and a plan of a portion of one of the sections, showing another form of adjusting and locking the tooth-bars; Fig. 12 a perspective view showing a modified form of the draft-bar; Fig. 13 a plan view partly in section of another form of draft-bar.

This invention relates to that class of harrows in which a series of teeth-carrying sections are loosely connected to the draft-bar, the teeth being so disposed in the frames or sections that the entire surface of the soil encompassed by the sections will be subjected to a thorough and uniform pulverization, as more fully hereinafter described.

Referring to the drawings by letters, A designates the sections, which are three in number, and B the draft-bar to which the same are connected by means of pivotal links C. Each of the frames is constructed of a single bar of angle-iron or steel $a$, said bar being suitably bent at the corners of the frame and having their overlapping ends $a'$ bolted or riveted together. The inwardly-extending flange $b$ formed on the lower edge of the bar $a$ is slitted or cut out transversely at points coincident with the corner-bends, as at $b'$ in Fig. 5, so that when the corner-bends are formed the adjacent ends formed by cutting the flange will overlap each other, as shown most clearly in Fig. 4. These overlapped flanges are bolted or riveted together at $b''$, thereby forming an exceedingly light but very rigid frame, but the bolts or rivets may be omitted if desired.

As shown most clearly in Figs. 2 and 4, the frame-bars may be formed of thin strips of sheet-metal having their longitudinal edges bent over upon themselves, thereby increasing the strength and lightness of the frame and avoiding raw edges, the raw edges of the strips terminating on the inside of the frame and near the corners of the angle-irons. The sections shown are substantially diamond or rhomboidal in shape, but it is evident that the frames may be rectangular or otherwise shaped if desired. As shown in Fig. 1 the outer front corners of the end sections are cut away at D, which prevents the end sections from interfering with the team in turning, while at the same time the arrangement of the tooth-bars and the general shape of the sections are not disturbed.

The tooth-bars $c$ are formed of angle-iron or angle-steel and are provided with journals $c'$ at their ends which are supported in the openings in the oblique side-bars of the sections. Each tooth-bar is preferably formed of a strip of thin sheet-metal having its longitudinal edges folded over upon themselves and terminating near the longitudinal bend made in forming the angle-iron, whereby a very light but strong bar is obtained. The end journals are formed by curling the ends of the strip upon themselves as shown most clearly in Fig. 2. The teeth which may be round or diamond or otherwise shaped in cross section, extend down through openings in the horizontal flange of the angle-iron and have their upper ends formed into eyes through which the securing bolts pass, said bolts fastening the teeth to the inner side of the vertical flange of the bar. Each bar carries an upwardly-extending arm $d$ which is preferably formed of sheet-metal folded upon itself and bifurcated at its upper end. Pivotally secured in the bifurcated upper end of the arms of each section is a rod or bar $d'$ which extends backwardly beyond the rear edge of the frame and carries a locking lever $d''$ whose lower edge is curved and notched to engage the upper edge of the rear frame-bar. This lever is pivoted to bar $d'$ at $d^2$ and its rear upper edge is notched at $d^3$ to engage under a pin $d^4$ carried by bar $d'$, and the lever is held in engagement with said pin $d^4$ by means of a swinging loop $d^5$ carried by said rod $d'$ and adapted to swing under the rear end of lever $d''$, as shown most clearly in Figs. 2 and 7. It will be observed that by means of these devices the teeth may be set at any angle desired and positively locked in their adjusted positions.

The draft-bar is constructed of a central section $e$ and end sections $e'$. The adjacent ends of the sections being overlapped and connected pivotally together by means of horizontal eye-bolts $e''$, to which the draft bail $e^2$ or the usual double-tree may be secured. The overlapped ends of the sections are locked in alignment by means of removable pins $e^3$ which pass horizontally through the overlapped parts of the bars and are held therein by suitable split keys or in any other manner. It will thus be seen that forming the draft-bar in sections corresponding in number to the harrow-sections and hinging said sections in line with the openings or spaces between the adjacent harrow sections, enables the sections of the draft-bar and the harrow to be folded over inwardly upon the central sections thereof in passing through gates and while being transported. Thus hinging the draft-bar and harrow sections also enables the end sections to be lifted in passing stumps and other obstructions in the field.

Two of the links $c$ are employed to connect each harrow section to the draft-bar, and each link has an open hook $f$ formed at its forward end which engages a swivel eye $f'$ carried by the draft-bar. To prevent the hooks $f$ from becoming detached from the eyes $f'$, each hook is provided with a swinging latch $f''$ which is pivoted in the free end of the hook and rests upon the main part of the link.

The rear ends of the links are each bent laterally and then upwardly at its extreme rear end, as at $f^3$ whereby said bent part $f^3$ may be passed inwardly through openings in the side bars of the harrow sections and locked therein by the upwardly extending part of the bent portion, said upwardly extending part lying against the inner side of the adjacent frame bar. Thus peculiarly forming the connecting links provides a safe but readily-separable connection between the harrow sections and the draft-bar, while at the same time it enables the sections of the harrow and draft-bar to be folded over upon the central section and as heretofore described.

Each side bar of the harrow sections is provided near its forward end with a series of holes $g$ to enable the links C to be connected to the bars near to or at some distance from the front edges of the harrow sections, whereby the "suck" or downward thrust of the front ends of the harrow section may be regulated. It is evident that the farther back the links are connected to the harrow sections the greater will be the downward suck or thrust of the harrow sections. As will be seen a series of the swiveled eye bolts $f'$ are necessary on the outer ends of the draft-bar in order that the outer links may be adjusted correspondingly to the other links and maintain the approximate parallelity of the front edges of the harrow sections. It will be observed that the outer links C are arranged obliquely to correspond to the obliquity of the beveled corners D, and when the harrow sections are brought nearer to the draft-bar to increase the suck of the harrow it is necessary that the said end links C be adjusted outwardly toward the outer ends of the draft-bar. It will therefore be observed that the cut away corners D enable the draft-bar to be made shorter.

Instead of locking the teeth-bars by the means shown in Figs. 1, 2 and 7 any other suitable locking and adjusting mechanism may be employed; for instance I may use a construction similar to that shown in Figs. 10 and 11, in which a horizontally-swinging lever $h$ is pivotally connected at one end to the rod $d'$ and is adjustably connected at its other end to the adjacent side-bar of the harrow sections by means of a pin $h'$, which engages the lever and any one of a series of openings $h''$ in the frame-bar.

Instead of forming the draft-bar as shown in Fig. 1, the sections thereof may be formed of angle-iron as shown in Fig. 12. In this form, the lower flanges of the bars project horizontally forward and the inner ends of the end sections of the draft-bar fit and rest within the angle of the central section, the sections being pivoted together by the horizontal pins or eye bolts $e^3$ and being locked in alignment by means of a bent pin $i$ which is readily removable. Another form of draft-bar is shown in Fig. 13. In this form the end sections are slidably connected to the central sections by means of metallic loops $j$ embracing the overlapped ends of the sections, the inner loops carrying the removable locking pins $j'$ which serve to hold the end sections extended. When using a draft-bar of this form it is evident that when the end sections of the harrow are folded over upon the central sections, the outer links must be detached from the draft-bar.

I do not wish to confine myself to using angle iron for the sections of the harrow, as the same may be constructed of flat bar-iron if desired. As shown in Fig. 2, the front end of the middle section may be curved or slanted upward, so that when the teeth are folded flat the frame will ride upon the ground in the manner of a sled.

The cut away corners D assist the horses in turning shorter and also permit the harrow to work closer to the fence.

Having thus fully described my invention, what I claim is—

1. A harrow section consisting of a frame and tooth-bars carried thereby, the side and end bars of said frame being constructed of sheet-metal strips having their edges folded over upon themselves, the lower edges of the bars thus formed being bent inwardly to form flanges, substantially as described.

2. The combination of a harrow frame and a series of tooth bars pivotally supported therein, each of said bars being constructed of sheet metal strip having its ends curled to form the pivots or journals of said tooth bars, and teeth carried by the bars, substantially as described.

3. A tooth bar for harrows consisting of a strip of sheet metal bent longitudinally to form an angle-iron and having its longitudinal edges bent over upon themselves and terminating near said longitudinal bend, substantially as described.

4. A pivoted tooth bar for harrows consisting of an angle-iron carrying the harrow teeth and having its ends curled to form the journals $c'$, substantially as described.

5. The combination of a harrow frame, tooth bars pivoted therein and carrying teeth and upwardly-extending arms, a rod connected to said arms, a lever $d''$ pivoted on said rod and having its forward part notched and adapted to engage an adjacent part of the frame, and means for locking the rear free end of said lever $d''$ to said rod, substantially as described.

6. The combination of a frame and pivoted tooth-bars carried thereby, a rod connecting said tooth-bars, a lever $d''$ pivoted on said rod and curved and notched on the under edge of its forward end to engage the frame, and a movable loop $d^5$ carried by said rod and adapted to engage under and lock the rear end of said lever $d''$, substantially as described.

7. In a harrow the combination of three sections, a draft-bar consisting of a series of three sections, said sections having their ends overlapped and pivoted together, means for locking the overlapped ends in alignment, and pivotal links connecting the sections of the harrow to the respective sections of the draft bar, substantially as described.

8. In a harrow the combination of a series of harrow sections, the front outer corners of the outer sections being beveled off at D, a jointed draft-bar and a series of links connecting the same to the harrow sections, the outermost links connecting the beveled off corners to the draft bar, said links being set obliquely to the line of draft, substantially as described.

9. The combination of a jointed draft-bar, a series of harrow sections, the outer sections having their front outer corners beveled off, as at D, and a series of swinging-links connecting the respective sections of the harrow to the draft bar, the rear ends of the links being longitudinally adjustable on the side bars of the harrow sections, the outermost links being set obliquely and adjustably connected to the draft bar, substantially as described.

In testimony whereof I affix my signature in presence of two witnesses.

GUSTAV BURKART.

Witnesses:
A. P. LAMBORN,
A. J. WESTLAND.